(12) United States Patent
Ni et al.

(10) Patent No.: US 10,909,734 B2
(45) Date of Patent: Feb. 2, 2021

(54) DATA VISUALIZATION METHOD AND APPARATUS

(71) Applicant: Huawei Technologies Co., Ltd., Shenzhen (CN)

(72) Inventors: Bing Ni, Shenzhen (CN); Yanhui Geng, Montreal (CA); Wenchao Wu, Hong Kong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/952,994

(22) Filed: Apr. 13, 2018

(65) Prior Publication Data

US 2018/0232918 A1 Aug. 16, 2018

Related U.S. Application Data

(63) Continuation of application No. PCT/CN2015/091852, filed on Oct. 13, 2015.

(51) Int. Cl.
  *G06T 11/20* (2006.01)
  *G06F 16/26* (2019.01)
  (Continued)

(52) U.S. Cl.
  CPC ............ *G06T 11/206* (2013.01); *G06F 16/00* (2019.01); *G06F 16/26* (2019.01); *G06F 16/29* (2019.01); *G06T 11/60* (2013.01)

(58) Field of Classification Search
  CPC .................................................... G06T 11/206
  (Continued)

(56) References Cited

U.S. PATENT DOCUMENTS

2006/0206512 A1* 9/2006 Hanrahan ............. G06F 16/248
2007/0214412 A1* 9/2007 Arquie .................... H04L 41/22
                                                                        715/210
(Continued)

FOREIGN PATENT DOCUMENTS

CN  102609966 A  7/2012
CN  103996068 A  8/2014
(Continued)

OTHER PUBLICATIONS

Doantam Phan, Ling Xiao, R. Yeh and P.Hanrahan, "Flow map layout," IEEE Symposium on Information (Year: 2005).*

(Continued)

*Primary Examiner* — Diane M Wills
(74) *Attorney, Agent, or Firm* — Conley Rose, P.C.

(57) ABSTRACT

A data visualization method and apparatus, where the method includes displaying a first density distribution diagram on a first map, where the first density distribution diagram represents density distribution, in a region, of source locations of flow events whose destinations are located in a target reference region, and displaying a second density distribution diagram on a second map, where the second density distribution diagram represents density distribution, in a region, of destinations of flow events whose source locations are located in the target reference region. Hence, bidirectional density distribution associated with each other using the target reference region are displayed on two maps in a linked manner, thereby implementing visualization of bidirectional density distribution data.

20 Claims, 6 Drawing Sheets

(51) Int. Cl.
*G06F 16/29* (2019.01)
*G06T 11/60* (2006.01)
*G06F 16/00* (2019.01)

(58) Field of Classification Search
USPC .............................................. 345/440, 440.2
See application file for complete search history.

(56) References Cited

U.S. PATENT DOCUMENTS

| | | | |
|---|---|---|---|
| 2012/0102419 | A1 | 4/2012 | Mital et al. |
| 2012/0262492 | A1* | 10/2012 | Ohashi ............... G01C 21/3664 345/660 |
| 2013/0181993 | A1 | 7/2013 | Herring et al. |
| 2013/0249917 | A1 | 9/2013 | Fanning et al. |
| 2015/0324812 | A1 | 11/2015 | Wang et al. |

FOREIGN PATENT DOCUMENTS

| | | |
|---|---|---|
| CN | 104054077 A | 9/2014 |
| CN | 104205062 A | 12/2014 |
| JP | 2012068901 A | 4/2012 |
| JP | 2013171541 A | 9/2013 |

OTHER PUBLICATIONS

Zhu et al, "Mapping Large Spatial Flow Data with Hierarchical Clustering", Transactions in GIS, Jun. 2014 (Year: 2014).*
Wood, Jo, Jason Dykes, and Aidan Slingsby. "Visualisation of origins, destinations and flows with OD maps." The Cartographic Journal 47.2 (2010): 117-129. (Year: 2010).*
Machine Translation and Abstract of Japanese Publication No. JP2012068901, Apr. 5, 2012, 42 pages.
Machine Translation and Abstract of Japanese Publication No. JP2013171541, Sep. 2, 2013, 30 pages.
Foreign Communication From A Counterpart Application, PCT Application No. PCT/CN2015/091852, English Translation of International Search Report dated Jul. 7, 2016, 2 pages.
Foreign Communication From A Counterpart Application, PCT Application No. PCT/CN2015/091852, English Translation of Written Opinion dated Jul. 7, 2016, 5 pages.

\* cited by examiner

DATA VISUALIZATION METHOD AND APPARATUS

CROSS-REFERENCE TO RELATED APPLICATION

This application is a continuation of International Patent Application No. PCT/CN2015/091852 filed on Oct. 13, 2015, the disclosure of which is hereby incorporated by reference in its entirety.

TECHNICAL FIELD

Embodiments of the present disclosure relate to the visualization field, and in particular, to a data visualization method and apparatus.

BACKGROUND

With development of wireless communications technologies and popularization of an intelligent terminal device, big data has emerged. In a big data era, a large amount of network data of different types is generated every day. Network data that records a flow event can well represent a habit and a regularity of work, social activities, and life of a person, and therefore visualization of such data is a current research focus. For example, a large quantity of mobile phones move from one base station to another base station every day, and this data is recorded by the base stations. Research and visualization performed on density distribution of the data help analyze distribution and a flow direction of people, thereby helping a decision maker make a decision.

According to a conventional visualization method, density distribution of the people is displayed using a density distribution diagram. A commonly-used density distribution diagram includes a thermodynamic diagram (e.g. heat map), a hot spot map, and the like. The thermodynamic diagram indicates density distribution of data or the people generally by rendering a color shade. The hot spot map indicates density distribution of data or the people generally by rendering a circle size and/or a color.

Generally, the people are concerned about both density distribution of the people flowing into a specific region and density distribution of the people flowing out from the region, that is, bidirectional (an inflow direction and an outflow direction) density distribution based on a reference region is considered. According to the conventional visualization method, different density distribution diagrams can only be displayed solely, and visualization cannot be well performed on data including bidirectional density distribution.

SUMMARY

Embodiments of the present disclosure provide a data visualization method and apparatus in order to implement visualization of data including bidirectional density distribution.

According to a first aspect, a data visualization method is provided, including obtaining a flow data set, where each piece of data in the flow data set is used to record a source location and a destination of a flow event, the flow data set includes an inflow data set and an outflow data set, all destinations recorded by data in the inflow data set are located in m preset reference regions, and all source locations recorded by data in the outflow data set are located in the m reference regions, obtaining input information of a user, where the input information is used to instruct to select a target reference region from the m reference regions, selecting an inflow data subset from the inflow data set according to the target reference region, where all destinations recorded by data in the inflow data subset are located in the target reference region, displaying a first density distribution diagram on a first map according to a source location recorded by data in the inflow data subset, where the first density distribution diagram is used to represent density distribution, in a region, of source locations of flow events whose destinations are located in the target reference region, selecting an outflow data subset from the outflow data set according to the target reference region, where all source locations recorded by data in the outflow data subset are located in the target reference region, and displaying a second density distribution diagram on a second map according to a destination recorded by data in the outflow data subset, where the second density distribution diagram is used to represent density distribution, in a region, of destinations of flow events whose source locations are located in the target reference region.

With reference to the first aspect, in an implementation of the first aspect, the method further includes displaying a third density distribution diagram on the first map according to a source location recorded by the data in the inflow data set, where the third density distribution diagram is used to represent density distribution, in a region, of source locations of flow events whose destinations are located in the m reference regions.

With reference to either the first aspect or the foregoing implementation, in another implementation of the first aspect, the first density distribution diagram and the third density distribution diagram are density distribution diagrams that overlap with each other and that are in different forms.

With reference to any one of the first aspect or the foregoing implementations, in another implementation of the first aspect, the third density distribution diagram is a thermodynamic diagram, and the first density distribution diagram is a hot spot map.

With reference to any one of the first aspect or the foregoing implementations, in another implementation of the first aspect, the method further includes displaying a fourth density distribution diagram on the second map according to a destination recorded by the data in the outflow data set, where the fourth density distribution diagram is used to represent density distribution, in a region, of destinations of flow events whose source locations are located in the m reference regions.

With reference to any one of the first aspect or the foregoing implementations, in another implementation of the first aspect, the second density distribution diagram and the fourth density distribution diagram are density distribution diagrams that overlap with each other and that are in different forms.

With reference to any one of the first aspect or the foregoing implementations, in another implementation of the first aspect, the fourth density distribution diagram is a thermodynamic diagram, and the second density distribution diagram is a hot spot map.

According to a second aspect, a data visualization apparatus is provided, including a first obtaining module configured to obtain a flow data set, where each piece of data in the flow data set is used to record a source location and a destination of a flow event, the flow data set includes an inflow data set and an outflow data set, all destinations recorded by data in the inflow data set are located in m preset reference regions, and all source locations recorded by data in the outflow data set are located in the m reference regions, a second obtaining module configured to obtain input information of a user, where the input information is used to instruct to select a target reference region from the m reference regions, a first selection module configured to select an inflow data subset from the inflow data set according to the target reference region, where all destinations recorded by data in the inflow data subset are located in the target reference region, a first display module configured to display a first density distribution diagram on a first map according to a source location recorded by data in the inflow data subset, where the first density distribution diagram is used to represent density distribution, in a region, of source locations of flow events whose destinations are located in the target reference region, a second selection module configured to select an outflow data subset from the outflow data set according to the target reference region, where all source locations recorded by data in the outflow data subset are located in the target reference region, and a second display module configured to display a second density distribution diagram on a second map according to a destination recorded by data in the outflow data subset, where the second density distribution diagram is used to represent density distribution, in a region, of destinations of flow events whose source locations are located in the target reference region.

With reference to the second aspect, in an implementation of the second aspect, the apparatus further includes a third display module configured to display a third density distribution diagram on the first map according to a source location recorded by the data in the inflow data set, where the third density distribution diagram is used to represent density distribution, in a region, of source locations of flow events whose destinations are located in the m reference regions.

With reference to either the second aspect or the foregoing implementation, in another implementation of the second aspect, the first density distribution diagram and the third density distribution diagram are density distribution diagrams that overlap with each other and that are in different forms.

With reference to any one of the second aspect or the foregoing implementations, in another implementation of the second aspect, the third density distribution diagram is a thermodynamic diagram, and the first density distribution diagram is a hot spot map.

With reference to any one of the second aspect or the foregoing implementations, in another implementation of the second aspect, the apparatus further includes a fourth display module configured to display a fourth density distribution diagram on the second map according to a destination recorded by the data in the outflow data set, where the fourth density distribution diagram is used to represent density distribution, in a region, of destinations of flow events whose source locations are located in the m reference regions.

With reference to any one of the second aspect or the foregoing implementations, in another implementation of the second aspect, the second density distribution diagram and the fourth density distribution diagram are density distribution diagrams that overlap with each other and that are in different forms.

With reference to any one of the second aspect or the foregoing implementations, in another implementation of the second aspect, the fourth density distribution diagram is a thermodynamic diagram, and the second density distribution diagram is a hot spot map.

In the embodiments of the present disclosure, after a target reference region selected by a user is obtained, a first density distribution diagram is displayed on a first map, and a second density distribution diagram is displayed on a second map. The first density distribution diagram describes a density distribution diagram that is based on the target reference region in an inflow direction, the second density distribution diagram describes a density distribution diagram that is based on the target reference region in an outflow direction, and the two density distribution diagrams are associated with each other using the target reference region. Therefore, according to the embodiments of the present disclosure, bidirectional density distribution associated with each other using the target reference region is displayed on the two maps in a linked manner, thereby implementing visualization of bidirectional density distribution data.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

For ease of understanding, an example diagram of an overall architecture of a visualization system that can implement a visualization method in an embodiment of the present disclosure is first described. It should be understood that the embodiment of the present disclosure is not limited to a system architecture shown in FIG. 1, and in addition, an apparatus in FIG. 1 may be hardware, or may be functionally divided software, or a combination thereof.

Figure 1:
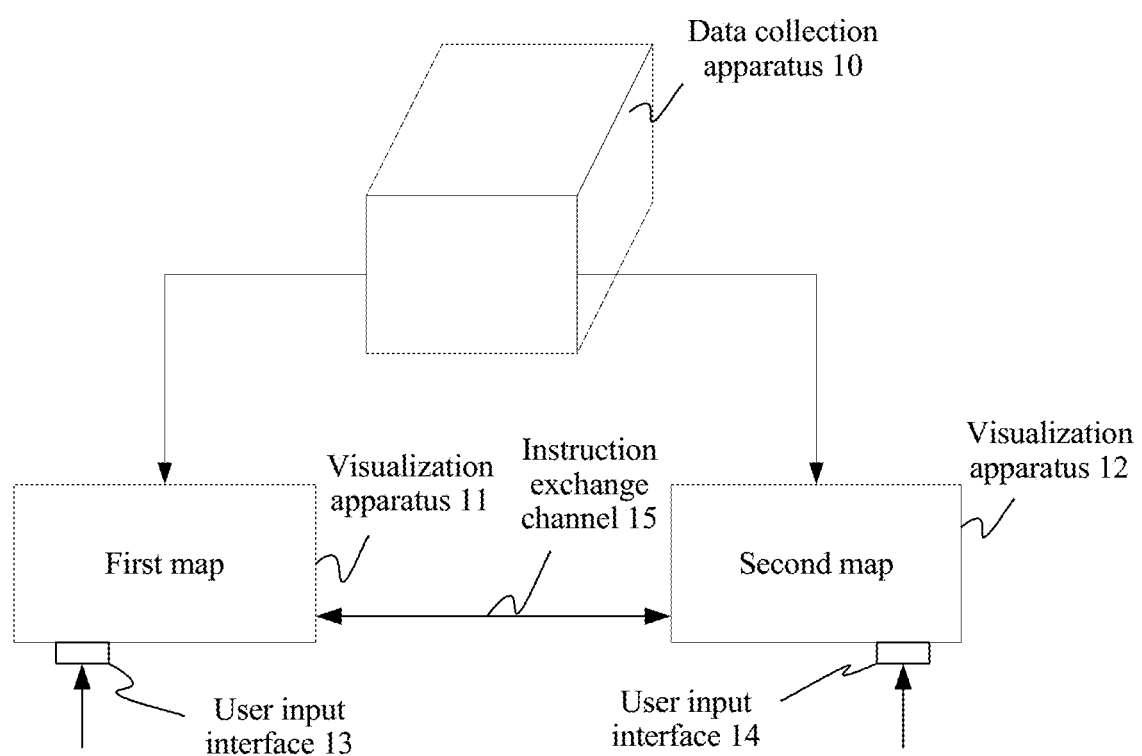
FIG. 1 is a schematic diagram of an overall architecture of a visualization system according to an embodiment of the present disclosure.

A visualization system shown in FIG. 1 includes a data collection apparatus 10, a visualization apparatus 11, and a visualization apparatus 12. The data collection apparatus 10 may be configured to collect data in a network in order to obtain a flow data set with bidirectional density distribution information. The flow data set may include an inflow data set and an outflow data set. All destinations recorded by the inflow data set are located within m preset reference regions, and all source locations recorded by the outflow data set are located within the m reference regions.

Figure 2:
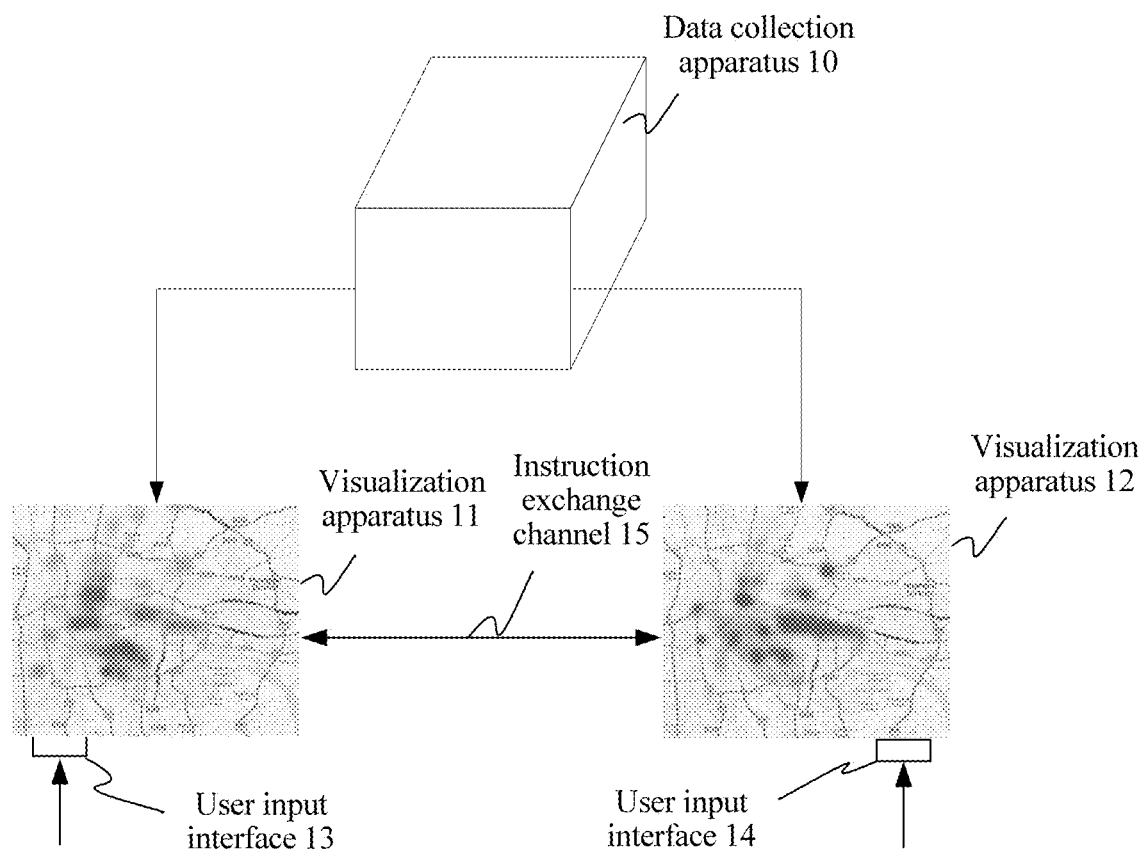
FIG. 2 is a schematic diagram of an initial state in a visualization system according to an embodiment of the present disclosure.

As shown in FIG. 1 and FIG. 2, the data collection apparatus 10 may send the inflow data set to the visualization apparatus 11, and the visualization apparatus 11 displays, on a first map and based on the inflow data set, density distribution in an inflow direction, and likewise, the data collection apparatus 10 may send the outflow data set to the visualization apparatus 12, and the visualization apparatus 12 displays, on a second map and based on the outflow data set, density distribution in an outflow direction. It should be understood that a gray area in FIG. 2 may be a thermodynamic diagram that represents a density distribution change using different color shades. It should be further understood that in this case, the first map displays an inflow density distribution diagram corresponding to the whole inflow data set, and likewise, the second map displays an outflow density distribution diagram corresponding to the whole outflow data set. Certainly, displaying an overall density distribution diagram corresponding to the whole data set on the first map is optional. Actually, the overall distribution diagram may not be displayed, but be displayed based on a user selection.

Figure 3:
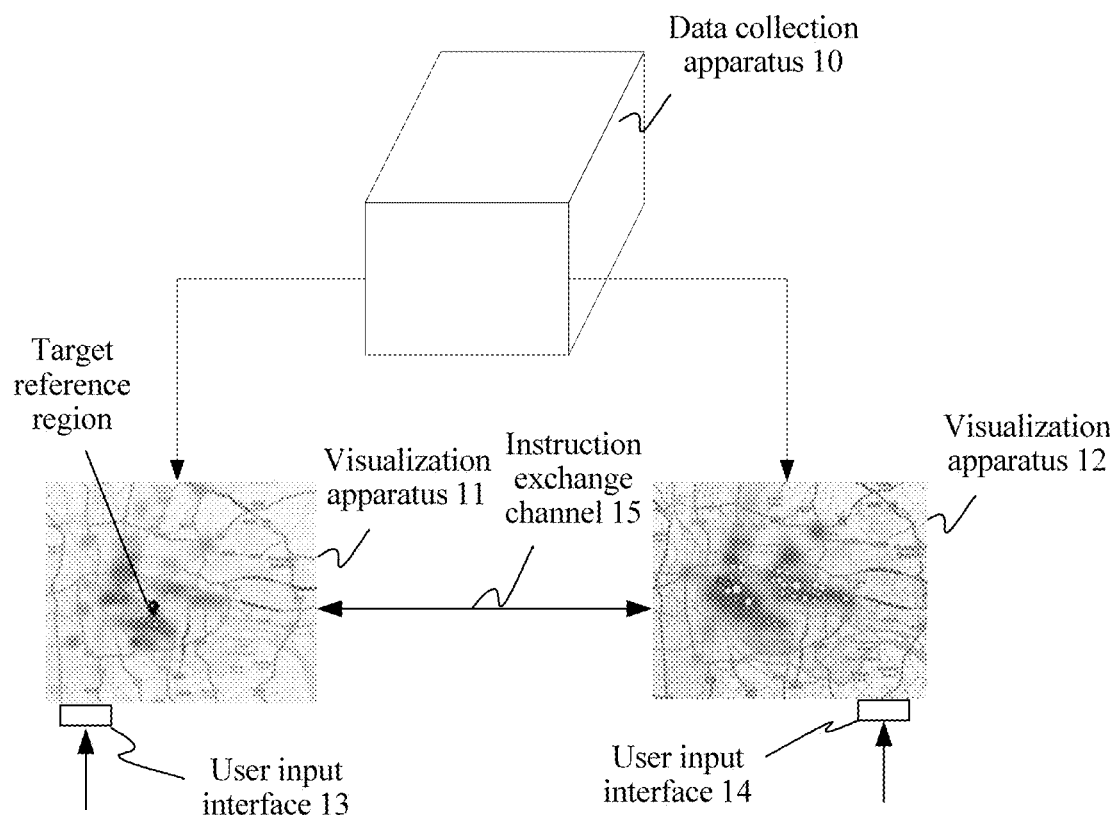
FIG. 3 is a schematic diagram of a visualization system in which a user instruction is received.
Figure 4:
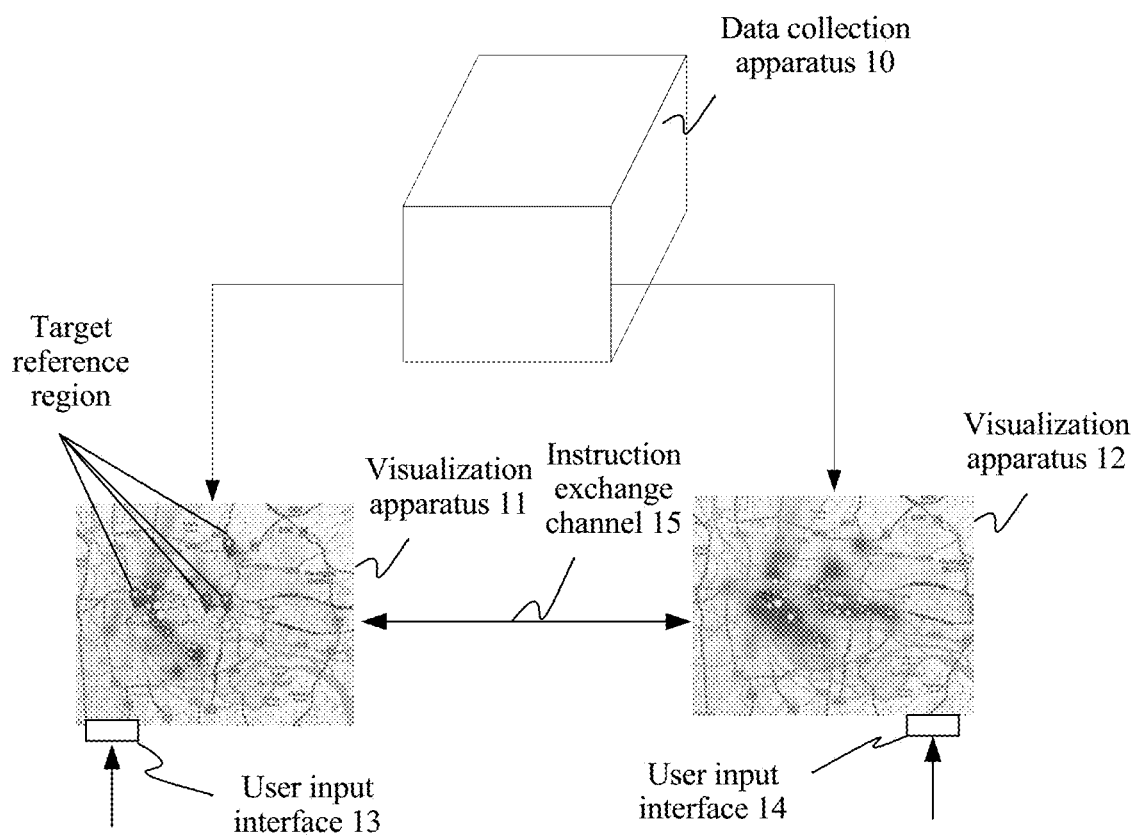
FIG. 4 is a schematic diagram of a visualization system in which a user instruction is received.

Referring to FIG. 3 and FIG. 4 and with respect to FIGS. 1 and 2, the visualization apparatus 11 may include a user input interface 13, a user may select, using the interface 13 to view inflow density distribution of a target reference region in m preset reference regions (one or more than one in the m reference regions), and after the user selects the target reference region, an inflow density distribution diagram corresponding to the target reference region is displayed on the first map. Then, the visualization apparatus 11 may send, using an instruction exchange channel between the visualization apparatus 11 and the visualization apparatus 12, the target reference region selected by the user to the visualization apparatus 12, and the visualization apparatus displays, on the second map and based on a user selection, an outflow density distribution diagram corresponding to the target reference region. Likewise, the visualization apparatus 12 correspondingly displays, on the second map, an outflow density distribution diagram corresponding to a target reference region. Similarly, the user may select a target reference region using a user input interface 14, and the visualization apparatus 12 displays, on the second map and based on a user selection, an outflow density distribution diagram corresponding to the target reference region. Then, the visualization apparatus 12 may send, using an instruction exchange channel 15, the target reference region selected by the user to the visualization apparatus 11, and the visualization apparatus 11 may display, based on a received user selection, an outflow density distribution diagram corresponding to the target reference region. In FIG. 3 and FIG. 4, the density distribution diagram corresponding to the target reference region is displayed based on an overall density distribution diagram, and is represented by a circle size.

Figure 5:
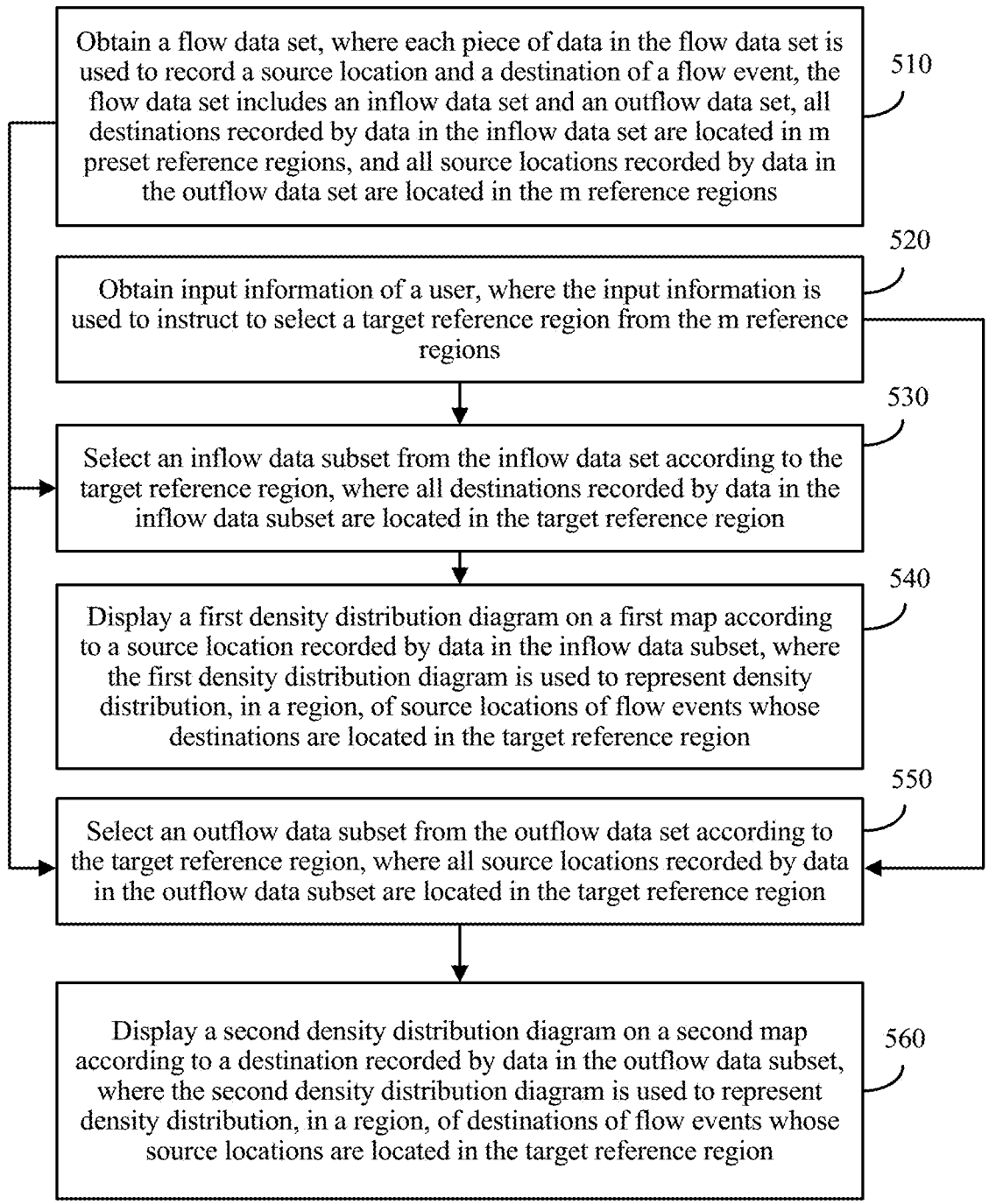
FIG. 5 is a schematic flowchart of a data visualization method according to an embodiment of the present disclosure.

It can be learned from description in FIG. 1 to FIG. 4, in the whole process, both the bidirectional density distribution diagrams displayed on the first map and the second map are associated based on user input. With reference to FIG. 5, the following describes in detail a visualization method in an embodiment of the present disclosure.

FIG. 5 is a schematic flowchart of a data visualization method according to an embodiment of the present disclosure. The method in FIG. 5 includes the following steps.

Step 510: Obtain a flow data set, where each piece of data in the flow data set is used to record a source location and a destination of a flow event, the flow data set includes an inflow data set and an outflow data set, all destinations recorded by data in the inflow data set are located in m preset reference regions, and all source locations recorded by data in the outflow data set are located in the m reference regions.

The foregoing flow data set includes both the inflow data set and the outflow data set, and therefore the flow data set may be considered as a data set with bidirectional flow information. All the destinations recorded by the inflow data set are located in the m preset reference regions, that is, the inflow data set includes information about data that flows into the m to-be-researched reference regions. Likewise, all the source locations recorded by the outflow data set are located in the m preset reference regions, that is, the outflow data set includes information about data that flows out of the m to-be-researched reference regions.

It should be understood that m is a positive integer, for example, $m \geq 2$.

It should be understood that the flow event, or referred to as a movement event, records a source location (or referred to as a start location) and a destination (or referred to as an end location) of an event. For example, if a mobile user moves from a base station A to a base station B, the flow event may record an address of the base station A and an address of the base station B.

It should be understood that the m reference regions may be pre-selected. For example, if life habits of the people in Beijing or a flow direction of the people in Beijing in one day needs to be researched, the Haidian District, the Xicheng District, and the Dongcheng District may be selected as the m reference regions.

Step 520: Obtain input information of a user, where the input information is used to instruct to select a target reference region in the m reference regions.

It should be understood that the input information may instruct to display, on a first map, a first density distribution diagram corresponding to a selected target reference region, for example, when a user selects a target reference region on the user input interface 13 of the visualization apparatus 11 shown in FIG. 1, it indicates that the user needs to view inflow density distribution corresponding to the target reference region, or the input information may instruct to display, on a second map, a second density distribution diagram corresponding to a selected target reference region, for example, when a user selects a target reference region on the user input interface 14 of the visualization apparatus 12 shown in FIG. 1, it indicates that the user needs to view outflow density distribution corresponding to the target reference region.

The foregoing target reference region may include one region or multiple regions.

Step 530: Select an inflow data subset from the inflow data set according to the target reference region, where all destinations recorded by data in the inflow data subset are located in the target reference region.

For example, the foregoing inflow data set may be pre-divided into m inflow data subsets, and when the user selects a target reference region, an inflow data subset corresponding to the target reference region is selected from the m pre-divided inflow subsets, or an online calculation manner may also be used, for example, after the user selects a target reference region, data whose corresponding destination is located in the target reference region is selected from the inflow data set in order to form the foregoing inflow data subset.

Step 540: Display a first density distribution diagram on a first map according to a source location recorded by data in the inflow data subset, where the first density distribution diagram is used to represent density distribution, in a region, of source locations of flow events whose destinations are located in the target reference region.

It should be understood that a specific form of the first density distribution diagram is not limited in this embodiment of the present disclosure, for example, the first density distribution diagram may be a thermodynamic diagram, a hot spot map, or a density distribution diagram in another form.

Step 550: Select an outflow data subset from the outflow data set according to the target reference region, where all source locations recorded by data in the outflow data subset are located in the target reference region.

For example, the foregoing outflow data set may be pre-divided into m inflow data subsets, and when the user selects a target reference region, an outflow data subset corresponding to the target reference region is selected from the m pre-divided outflow subsets, or an online calculation manner may also be used, for example, after the user selects a target reference region, data whose corresponding destination is located in the target reference region is selected from the outflow data set in order to form the foregoing outflow data subset.

Step 560: Display a second density distribution diagram on a second map according to a destination recorded by data in the outflow data subset, where the second density distribution diagram is used to represent density distribution, in a region, of destinations of flow events whose source locations are located in the target reference region.

It should be understood that a specific form of the second density distribution diagram is not limited in this embodiment of the present disclosure, for example, the first density distribution diagram may be a thermodynamic diagram, a hot spot map, or a density distribution diagram in another form.

In this embodiment of the present disclosure, after a target reference region selected by a user is obtained, a first density distribution diagram is displayed on a first map, and a second density distribution diagram is displayed on a second map. The first density distribution diagram describes a density distribution diagram that is based on the target reference region in an inflow direction, the second density distribution diagram describes a density distribution diagram that is based on the target reference region in an outflow direction, and the two density distribution diagrams are associated with each other using the target reference region. Therefore, according to this embodiment of the present disclosure, bidirectional density distribution associated with each other using the target reference region is displayed on the two maps in a linked manner, thereby implementing visualization of bidirectional density distribution data.

Optionally, in an embodiment, the method in FIG. 1 may further include displaying a third density distribution diagram on the first map according to a source location recorded by the data in the inflow data set, where the third density distribution diagram is used to represent density distribution, in a region, of source locations of flow events whose destinations are located in the m reference regions.

It should be understood that the first density distribution diagram and the third density distribution diagram may be density distribution diagrams that overlap with each other and that are in different forms. For example, the first density distribution diagram is a thermodynamic diagram, and the third density distribution diagram is a hot spot map. Therefore, both overall density distribution represented by an inflow data set in an inflow direction and density distribution corresponding to a target reference region selected by a user and that is in an inflow direction are displayed on one map.

Optionally, in an embodiment, the third density distribution diagram may be a thermodynamic diagram, and the first density distribution diagram may be a hot spot map that represents a density distribution change using circles.

Optionally, in an embodiment, the method in FIG. 1 may further include displaying a fourth density distribution diagram on the second map according to a destination recorded by the data in the outflow data set, where the fourth density distribution diagram is used to represent density distribution, in a region, of destinations of flow events whose source locations are located in the m reference regions.

It should be understood that the second density distribution diagram and the fourth density distribution diagram may be density distribution diagrams that overlap with each other and that are in different forms. For example, the second density distribution diagram is a thermodynamic diagram, and the fourth density distribution diagram is a hot spot map. Therefore, both overall density distribution represented by an outflow data set in an outflow direction and density distribution corresponding to a target reference region selected by a user and that is in an outflow direction are displayed on one map.

Optionally, in an embodiment, the second density distribution diagram and the fourth density distribution diagram may be density distribution diagrams that overlap with each other and that are in different forms.

Optionally, in an embodiment, the fourth density distribution diagram may be a thermodynamic diagram, and the second density distribution diagram may be a hot spot map that represents a density distribution change using circles.

The foregoing has descried in detail, with reference to FIG. 1 to FIG. 5, the data visualization method according to the embodiments of the present disclosure. The following describes in detail, with reference to FIG. 6 to FIG. 7, a data visualization apparatus according to the embodiments of the present disclosure. It should be understood that the apparatus in FIG. 6 to FIG. 7 can implement all the steps in FIG. 1 to FIG. 5, and to avoid repetition, details are not described herein again.

Figure 6:
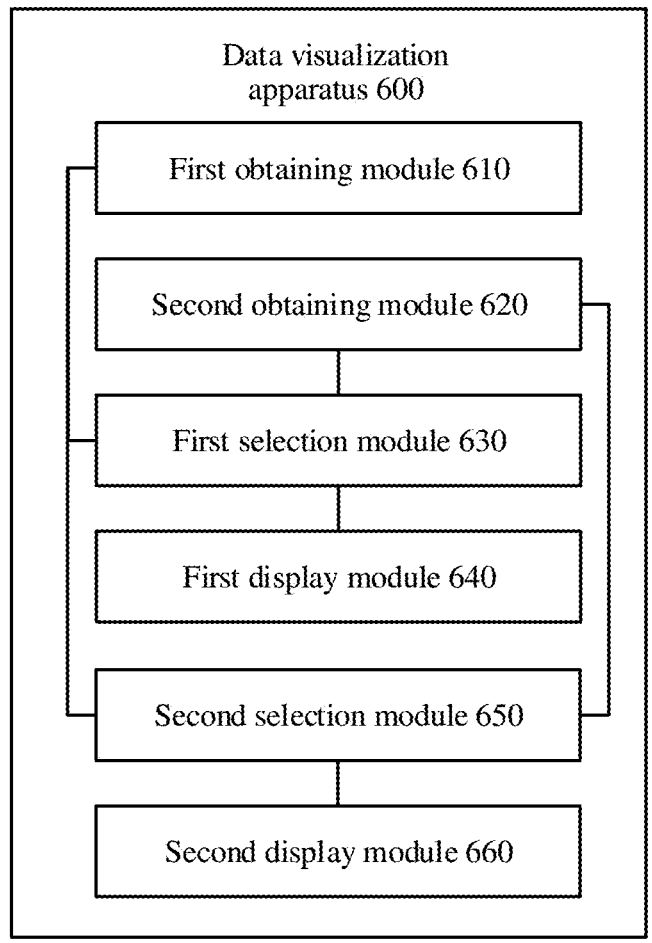
FIG. 6 is a schematic block diagram of a data visualization apparatus according to an embodiment of the present disclosure.

FIG. 6 is a schematic block diagram of a data visualization apparatus 600 according to an embodiment of the present disclosure. The apparatus 600 in FIG. 6 includes a first obtaining module 610 configured to obtain a flow data set, where each piece of data in the flow data set is used to record a source location and a destination of a flow event, the flow data set includes an inflow data set and an outflow data set, all destinations recorded by data in the inflow data set are located in m preset reference regions, and all source locations recorded by data in the outflow data set are located in the m reference regions, a second obtaining module 620 configured to obtain input information of a user, where the input information is used to instruct to select a target reference region from the m reference regions, a first selection module 630 configured to select an inflow data subset from the inflow data set according to the target reference region, where all destinations recorded by data in the inflow data subset are located in the target reference region, a first display module 640 configured to display a first density distribution diagram on a first map according to a source location recorded by data in the inflow data subset, where the first density distribution diagram is used to represent density distribution, in a region, of source locations of flow events whose destinations are located in the target reference region, a second selection module 650 configured to select an outflow data subset from the outflow data set according to the target reference region, where all source locations recorded by data in the outflow data subset are located in the target reference region, and a second display module 660 configured to display a second density distribution diagram on a second map according to a destination recorded by data in the outflow data subset, where the second density distribution diagram is used to represent density distribution, in a region, of destinations of flow events whose source locations are located in the target reference region.

In this embodiment of the present disclosure, after a target reference region selected by a user is obtained, a first density distribution diagram is displayed on a first map, and a second density distribution diagram is displayed on a second map. The first density distribution diagram describes a density distribution diagram that is based on the target reference region in an inflow direction, the second density distribution diagram describes a density distribution diagram that is based on the target reference region in an outflow direction, and the two density distribution diagrams are associated with each other using the target reference region. Therefore, according to this embodiment of the present disclosure, bidirectional density distribution associated with each other using the target reference region is displayed on the two maps in a linked manner, thereby implementing visualization of bidirectional density distribution data.

Optionally, in an embodiment, the apparatus 600 may further include a third display module (not shown) configured to display a third density distribution diagram on the first map according to a source location recorded by the data in the inflow data set, where the third density distribution diagram is used to represent density distribution, in a region, of source locations of flow events whose destinations are located in the m reference regions.

Optionally, in an embodiment, the first density distribution diagram and the third density distribution diagram may be density distribution diagrams that overlap with each other and that are in different forms.

Optionally, in an embodiment, the third density distribution diagram may be a thermodynamic diagram, and the first density distribution diagram may be a hot spot map.

Optionally, in an embodiment, the apparatus 600 may further include a fourth display module (not shown) configured to display a fourth density distribution diagram on the second map according to a destination recorded by the data in the outflow data set, where the fourth density distribution diagram is used to represent density distribution, in a region, of destinations of flow events whose source locations are located in the m reference regions.

Optionally, in an embodiment, the second density distribution diagram and the fourth density distribution diagram may be density distribution diagrams that overlap with each other and that are in different forms.

Optionally, in an embodiment, the fourth density distribution diagram may be a thermodynamic diagram, and the second density distribution diagram may be a hot spot map.

Figure 7:
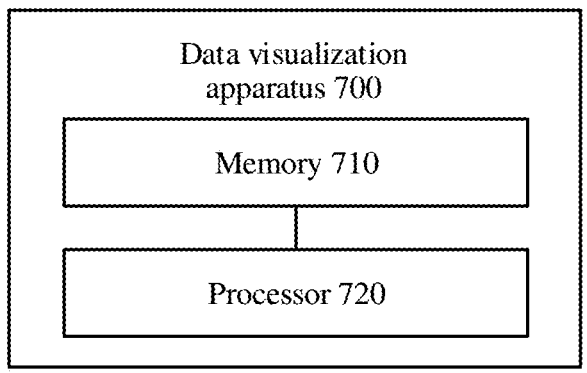
FIG. 7 is a schematic block diagram of a data visualization apparatus according to an embodiment of the present disclosure.

FIG. 7 is a schematic block diagram of a data visualization apparatus 700 according to an embodiment of the present disclosure. The apparatus 700 in FIG. 7 includes a memory 710 configured to store a program, and a processor 720 configured to execute the program, where when the program is executed, the processor 720 is configured to obtain a flow data set, where each piece of data in the flow data set is used to record a source location and a destination of a flow event, the flow data set includes an inflow data set and an outflow data set, all destinations recorded by data in the inflow data set are located in m preset reference regions, and all source locations recorded by data in the outflow data set are located in the m reference regions, obtain input information of a user, where the input information is used to instruct to select a target reference region from the m reference regions, select an inflow data subset from the inflow data set according to the target reference region, where all destinations recorded by data in the inflow data subset are located in the target reference region, display a first density distribution diagram on a first map according to a source location recorded by data in the inflow data subset, where the first density distribution diagram is used to represent density distribution, in a region, of source locations of flow events whose destinations are located in the target reference region, select an outflow data subset from the outflow data set according to the target reference region, where all source locations recorded by data in the outflow data subset are located in the target reference region, and display a second density distribution diagram on a second map according to a destination recorded by data in the outflow data subset, where the second density distribution diagram is used to represent density distribution, in a region, of destinations of flow events whose source locations are located in the target reference region.

In this embodiment of the present disclosure, after a target reference region selected by a user is obtained, a first density distribution diagram is displayed on a first map, and a second density distribution diagram is displayed on a second map. The first density distribution diagram describes a density distribution diagram that is based on the target reference region in an inflow direction, the second density distribution diagram describes a density distribution diagram that is based on the target reference region in an outflow direction, and the two density distribution diagrams are associated with each other using the target reference region. Therefore, according to this embodiment of the present disclosure, bidirectional density distribution associated with each other using the target reference region is displayed on the two maps in a linked manner, thereby implementing visualization of bidirectional density distribution data.

Optionally, in an embodiment, the processor 720 may further include a third display module (not shown) configured to display a third density distribution diagram on the first map according to a source location recorded by the data in the inflow data set, where the third density distribution diagram is used to represent density distribution, in a region, of source locations of flow events whose destinations are located in the m reference regions.

Optionally, in an embodiment, the first density distribution diagram and the third density distribution diagram may be density distribution diagrams that overlap with each other and that are in different forms.

Optionally, in an embodiment, the third density distribution diagram may be a thermodynamic diagram, and the first density distribution diagram may be a hot spot map.

Optionally, in an embodiment, the processor 720 may further include a fourth display module (not shown) configured to display a fourth density distribution diagram on the second map according to a destination recorded by the data in the outflow data set, where the fourth density distribution diagram is used to represent density distribution, in a region, of destinations of flow events whose source locations are located in the m reference regions.

Optionally, in an embodiment, the second density distribution diagram and the fourth density distribution diagram may be density distribution diagrams that overlap with each other and that are in different forms.

Optionally, in an embodiment, the fourth density distribution diagram may be a thermodynamic diagram, and the second density distribution diagram may be a hot spot map.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present disclosure may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of the present disclosure essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data visualization method, comprising:
obtaining a flow data set, wherein each piece of data in the flow data set records a flow event describing a mobile device changing locations from a source location to a destination, wherein the source location corresponds to a source base station and the destination location corresponds to a destination base station, wherein the flow data set comprises an inflow data set and an outflow data set, wherein all destinations recorded by data in the inflow data set are located in a plurality of preset reference regions, and wherein all source locations recorded by data in the outflow data set are located in the preset reference regions;
obtaining input information from a user selecting a target reference region from the preset reference regions, wherein the input information indicates a request to view an inflow density distribution corresponding to the target reference region;
selecting an inflow data subset from the inflow data set according to the target reference region in response to obtaining the input information from the user selecting the target reference region, wherein all destinations recorded by data in the inflow data subset are located in the target reference region;
displaying a first density distribution diagram representing the inflow density distribution of source locations of flow events having destinations that are located in the target reference region on a first map according to a source location recorded by the data in the inflow data subset in response to obtaining the input information;
selecting an outflow data subset from the outflow data set according to the target reference region in response to obtaining the input information from the user selecting the target reference region and selecting the inflow data subset from the inflow data set according to the target reference region, wherein all source locations recorded by data in the outflow data subset are located in the target reference region; and
displaying a second density distribution diagram representing an outflow density distribution of destinations of the flow events having source locations that are located in the target reference region on a second map according to a destination recorded by the data in the outflow data subset, wherein both the first density distribution diagram and the second density distribution diagram are linked together by the input information of the user and are both associated with the target reference area.

2. The data visualization method of claim 1, further comprising displaying a third density distribution diagram representing a density distribution of source locations of the flow events having destinations that are located in the preset reference regions on the first map according to a source location recorded by the data in the inflow data set.

3. The data visualization method of claim 2, wherein the first density distribution diagram and the third density distribution diagram comprise density distribution diagrams in different forms and overlap with each other.

4. The data visualization method of claim 3, wherein the third density distribution diagram comprises a thermodynamic diagram, and wherein the first density distribution diagram comprises a hot spot map.

5. The data visualization method of claim 2, further comprising displaying a fourth density distribution diagram representing a density distribution of destinations of the flow events having source locations that are located in the preset reference regions on the second map according to a destination recorded by the data in the outflow data set.

6. The data visualization method of claim 5, wherein the second density distribution diagram and the fourth density distribution diagram comprise density distribution diagrams in different forms and overlap with each other.

7. The data visualization method of claim 6, wherein the fourth density distribution diagram comprises a thermodynamic diagram, and wherein the second density distribution diagram comprises a hot spot map.

8. The data visualization method of claim 1, wherein the first density distribution diagram is displayed on a first visualization apparatus, wherein the second density distribution diagram is displayed on a second visualization apparatus, and wherein the first visualization apparatus and the second visualization apparatus are coupled to each other using an instruction exchange channel.

9. The data visualization method of claim 1, wherein the first density distribution diagram and the second density distribution diagram are displayed simultaneously.

10. The data visualization method of claim 1, wherein the first density distribution diagram and the second density distribution diagram both correspond to a same geographical area, and wherein both the first map and the second map are displayed in color.

11. A data visualization apparatus, comprising:
a memory comprising instructions; and
a processor coupled to the memory, wherein the instructions cause the processor to be configured to:
obtain a flow data set, wherein each piece of data in the flow data set records a flow event describing a mobile device changing locations from a source location to a destination, wherein the source location corresponds to a source base station and the destination location corresponds to a destination base station, wherein the flow data set comprises an inflow data set and an outflow data set, wherein all destinations recorded by data in the inflow data set are located in a plurality of preset reference regions, and wherein all source locations recorded by data in the outflow data set are located in the preset reference regions;
obtain input information from a user selecting a target reference region from the preset reference regions, wherein the input information indicates a request to view an inflow density distribution corresponding to the target reference region;
select an inflow data subset from the inflow data set according to the target reference region in response to the input information from the user selecting the target reference region being obtained, wherein all destinations recorded by data in the inflow data subset are located in the target reference region;
display a first density distribution diagram representing the inflow density distribution of source locations of flow events having destinations that are located in the target reference region on a first map according to a source location recorded by the data in the inflow data subset in response to obtaining the input information;
select an outflow data subset from the outflow data set according to the target reference region in response to the input information from the user selecting the target reference region being obtained and the inflow data subset from the inflow data set being selected according to the target reference region, wherein all source locations recorded by data in the outflow data subset are located in the target reference region; and
display a second density distribution diagram representing an outflow density distribution of destinations of the flow events having source locations that are located in the target reference region on a second map according to a destination recorded by the data in the outflow data subset in response to obtaining the input information, wherein both the first density distribution diagram and the second density distribution diagram are linked together by the input information of the user and are both associated with the target reference area.

12. The data visualization apparatus of claim 11, wherein the instructions further cause the processor to be configured to display a third density distribution diagram representing a density distribution of source locations of the flow events having destinations that are located in the preset reference regions on the first map according to a source location recorded by the data in the inflow data set.

13. The data visualization apparatus of claim 12, wherein the first density distribution diagram and the third density distribution diagram comprise density distribution diagrams in different forms and overlap with each other.

14. The data visualization apparatus of claim 13, wherein the third density distribution diagram comprises a thermodynamic diagram, and wherein the first density distribution diagram comprises a hot spot map.

15. The data visualization apparatus of claim 12, wherein the instructions further cause the processor to be configured to display a fourth density distribution diagram representing a density distribution of destinations of the flow events having source locations that are located in the preset reference regions on the second map according to a destination recorded by the data in the outflow data set.

16. The data visualization apparatus of claim 15, wherein the second density distribution diagram and the fourth density distribution diagram comprise density distribution diagrams in different forms and overlap with each other.

17. The data visualization apparatus of claim 16, wherein the fourth density distribution diagram comprises a thermodynamic diagram, and wherein the second density distribution diagram comprises a hot spot map.

18. The data visualization apparatus of claim 11, wherein the first density distribution diagram is displayed on a first visualization apparatus, wherein the second density distribution diagram is displayed on a second visualization apparatus, and wherein the first visualization apparatus and the second visualization apparatus are coupled to each other using an instruction exchange channel.

19. The data visualization apparatus of claim 11, wherein the first density distribution diagram and the second density distribution diagram are displayed simultaneously.

20. The data visualization apparatus of claim 11, wherein the first density distribution diagram and the second density distribution diagram both correspond to a same geographical area, and wherein both the first map and the second map are displayed in color.

* * * * *